United States Patent [19]
Thibault

[11] Patent Number: 5,270,489
[45] Date of Patent: Dec. 14, 1993

[54] UTILITY PULL BOX

[76] Inventor: André J. Thibault, 47 Wakefield Drive SW., Calgary, Alberta, Canada, T3C 2W8

[21] Appl. No.: 813,035

[22] Filed: Dec. 24, 1991

[51] Int. Cl.$^5$ .............................................. H02G 9/00
[52] U.S. Cl. ..................................... 174/37; 174/65 R
[58] Field of Search .................... 174/37, 48, 50, 65 R

[56] References Cited
U.S. PATENT DOCUMENTS

| | | | |
|---|---|---|---|
| 262,630 | 8/1882 | Vail | 174/37 |
| 343,458 | 6/1886 | Hull | 174/37 |
| 1,087,366 | 2/1914 | Haase | 174/37 |

*Primary Examiner*—Harold Broome
*Attorney, Agent, or Firm*—John Russell Uren

[57] ABSTRACT

A utility pull box for use in electrical power feed and distribution networks. The pull box is made in a hexagonal configuration with six panels of equal width, all having the same included angle between adjacent panels. A plurality of knock-out windows are located in the lower area of the panels and serve as entranceways for cable carrying ducts which cables are to be connected to appropriate buss hardware located in the interior of the utility box.

9 Claims, 8 Drawing Sheets

1

UTILITY PULL BOX

INTRODUCTION

The present invention relates to a utility pull box and, more particularly, to a utility pull box of a hexagonal configuration that is used for power feed and distribution.

BACKGROUND OF THE INVENTION

The use of utility pull boxes for power feed and distribution purposes is pervasive. Such pull boxes are generally located underground at the "grade" level and they are used for accommodating distribution and/or feeder class power cables so as to allow such cables to be removed in the event of an interruption in power service.

Prior art pull boxes are generally cubicle in form. The distribution or feeder cables enter the interior of the prior art pull box through its bottom and each of the three wires associated with each power cable is attached to a different buss, each of the required busses being located on respective different walls of the pull box. The covers for such pull boxes are rectangular and the lid mounted in the central portion of the cover is usually rectangular.

However, there are inherent disadvantages present in association with present utility pull boxes. Initially, the power cables that enter the interior of the boxes are unwieldy and such cables have a large bending radius recommended by the cable manufacturer. Likewise, since there are a number of overlapping cables within the box, when the cables are connected to the respective busses, it can be dangerous to remove a cable from the buss within the box without risking the accidental removal of adjacent cables from their respective busses. This is so because the movement of one cable may cause dislodgement of a further cable and such dislodgement may result in a live power cable being uncontrolled within the box.

A further disadvantage relates to pulling the cables to the box. In previous boxes, the cables must be bent 90 degrees when approaching and entering the box. Such a significant turn produced a great deal of side wall friction being generated between the cable and the duct through which the cable is pulled. This can result in destruction of the duct and destruction of the cable.

A further disadvantage related to the lid used for the cover of previous utility pull boxes. If the lid was rectangular in form and because the lid is heavy, it could be inadvertently dropped into the box and thereby detach the cables mounted therein. Again, a dangerous condition was created.

Yet a further disadvantage inherent in present utility pull boxes relates to the movement of the cables within the interior of the utility box. The manufacturers of such cables specify a minimum radius for the bending of such cables and a smaller radius for such bending can adversely affect the life and performance of the cables. In utility pull boxes in present use, the cables may be required to exceed the radius dimension specified by the manufacturer because of the difficulty in distributing such cables to their respective busses.

SUMMARY OF THE PRESENT INVENTION

According to one aspect of the invention, there is provided a utility pull box having a plurality of panels joined together, each of said panels being the same width, the included angle between adjacent ones of said panels being greater than 90 degrees and a plurality of windows mounted in the lower portion of at least some of said panels for allowing entry and egress of power cables between the outside and the interior of said pull box.

BRIEF DESCRIPTION OF THE SEVERAL VIEWS OF THE DRAWINGS

Embodiments of the invention will now be described, by way of example only, with the use of drawings in which.

DESCRIPTION OF SPECIFIC EMBODIMENT

Figure 1:
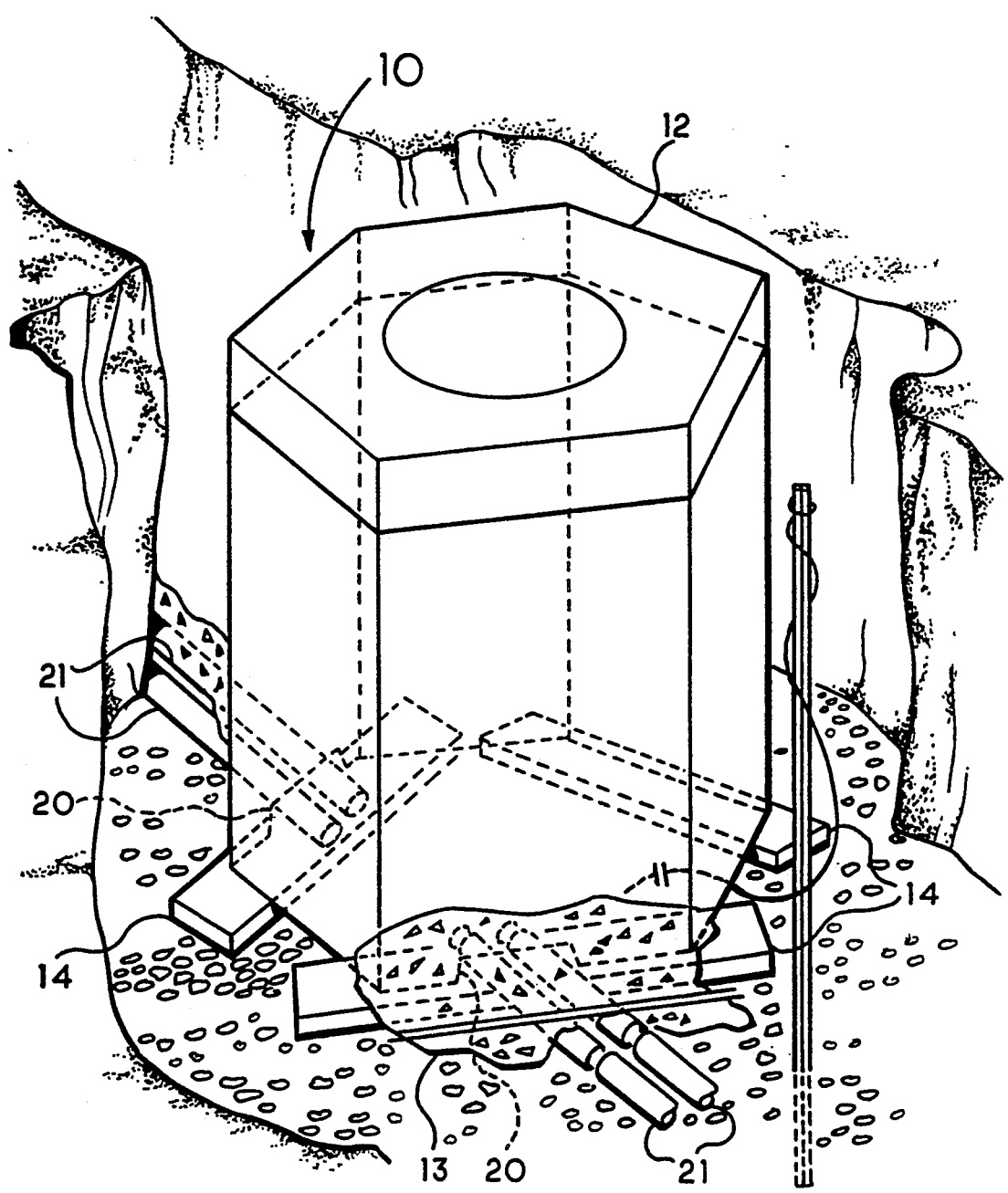
FIG. 1 is a diagrammatic isometric view of the utility pull box according to the invention in its installed position with the cover at grade level.

Referring now to the drawings, a utility pull box according to the invention is generally illustrated at 10 in FIG. 1. It comprises a box generally illustrated at 11 having a hexagonal configuration as shown and a cover of like outside configuration generally illustrated at 12.

The utility pull box 10 is mounted on three planks 14, the planks 14 being mounted on a gravel base 13.

A plurality of windows 20, one in two of the panels of the hexagonal circumference, are mounted as illustrated in the bottom area of each panel 23 of utility box 10. Ducts 21 extend into the interior of the box 10 through the windows 20 and carry the power cables as will be described in greater detail hereafter. The ducts 21 are preferably mounted at an angle of 30° with the side of the panel 23 through which they extend as indicated. The pull box 10 is mounted underground with its upper surface at or near grade level as illustrated.

Referring now to FIG. 2, the utility pull box 10 is illustrated in more detail. The maximum outside width measures approximately 1848 mm (FIG. 2B) with each face 22 being 924 mm long in the horizontal direction. The length of each interior face 25 is approximately 751 mm and the wall thickness is approximately 150 mm at the top and 100 mm at the bottom to assist in removing the box from its concrete form. The box 10 is made from reinforced concrete and has a knockout window 20 formed in the bottom of the box 10 in each of the panel members 23 (FIG. 2B). Each of the knockout windows 20 has the dimensions illustrated in FIGS. 2A, 2C and 2D and a 5 mm groove 36 is cut in the concrete to assist in removing the desired window 20 as illustrated in FIG. 2C.

Two C-channels 24,30 (FIGS. 2C and 2D) are also cast in the concrete of each of the panels 23 of the pull box 10. The two C-channels are used to allow the attachment of busses and/or other hardware for use with connecting the power cables as will be described in greater detail hereafter.

Figure 2B:
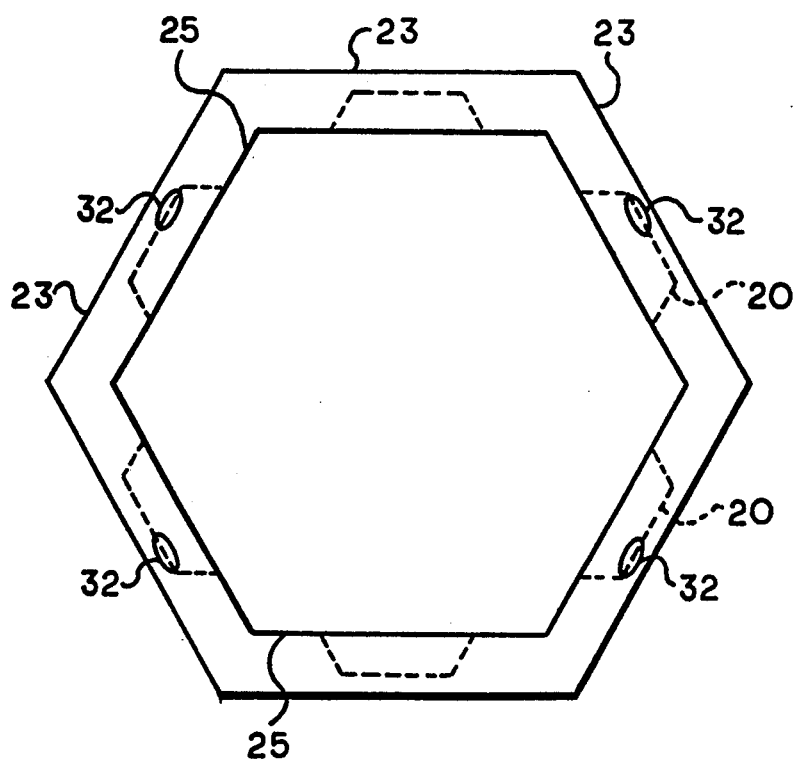
FIG. 2B is a plan view of the utility pull box of FIG. 2A.
Figure 2C:
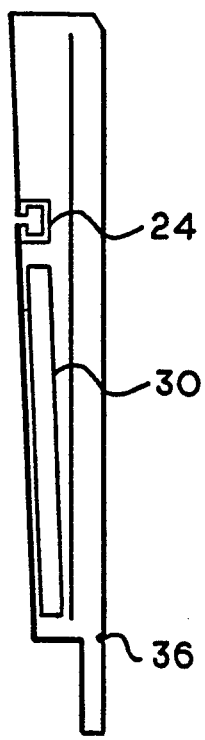
FIG. 2C is a view taken along IIC—IIC of FIG. 2B.
Figure 2A:
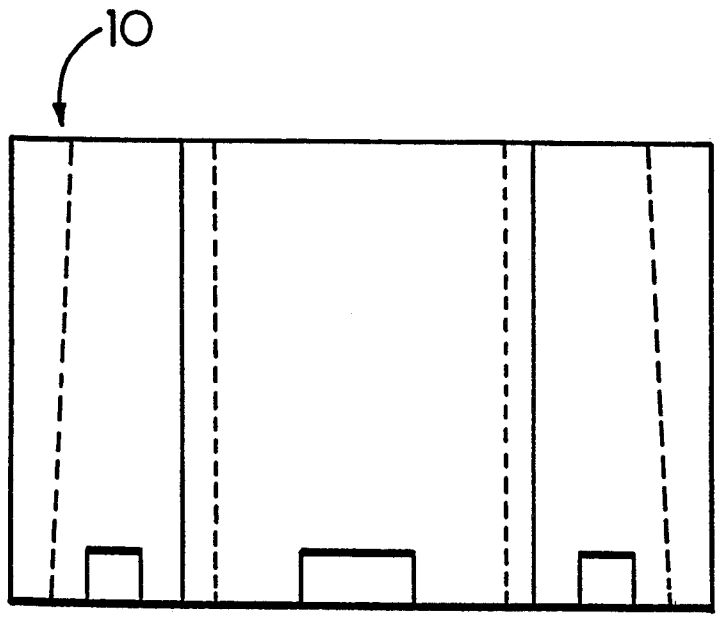
FIG. 2A is an elevation view of the utility pull box of FIG. 1.
Figure 2D:
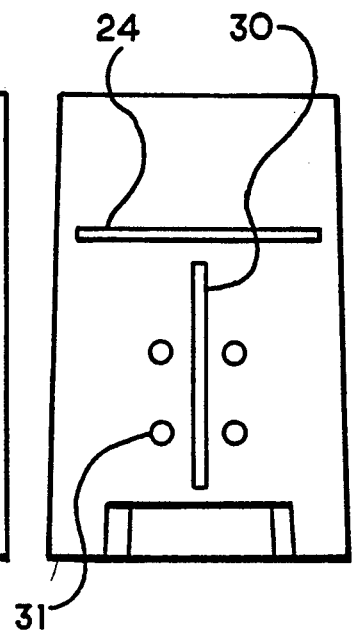
FIG. 2D is a view taken along IID—IID of FIG. 2B.

Four inserts 31 are also mounted in the concrete of the utility pull box 10 (FIG. 2D). The inserts 31 are used to attach a steel plate (not shown) which can be used to attach a pulley or other like apparatus for pulling the power cables through the ducts 21 and into the utility box 10.

Four lifting anchors 32 are also set in the concrete on the upper surface of the box 10 (FIG. 2B). These anchors 32 are used to allow the utility box 10 to be raised or lowered by a crane or like apparatus when movement or installation of the utility box 10 is required.

Figure 3A:
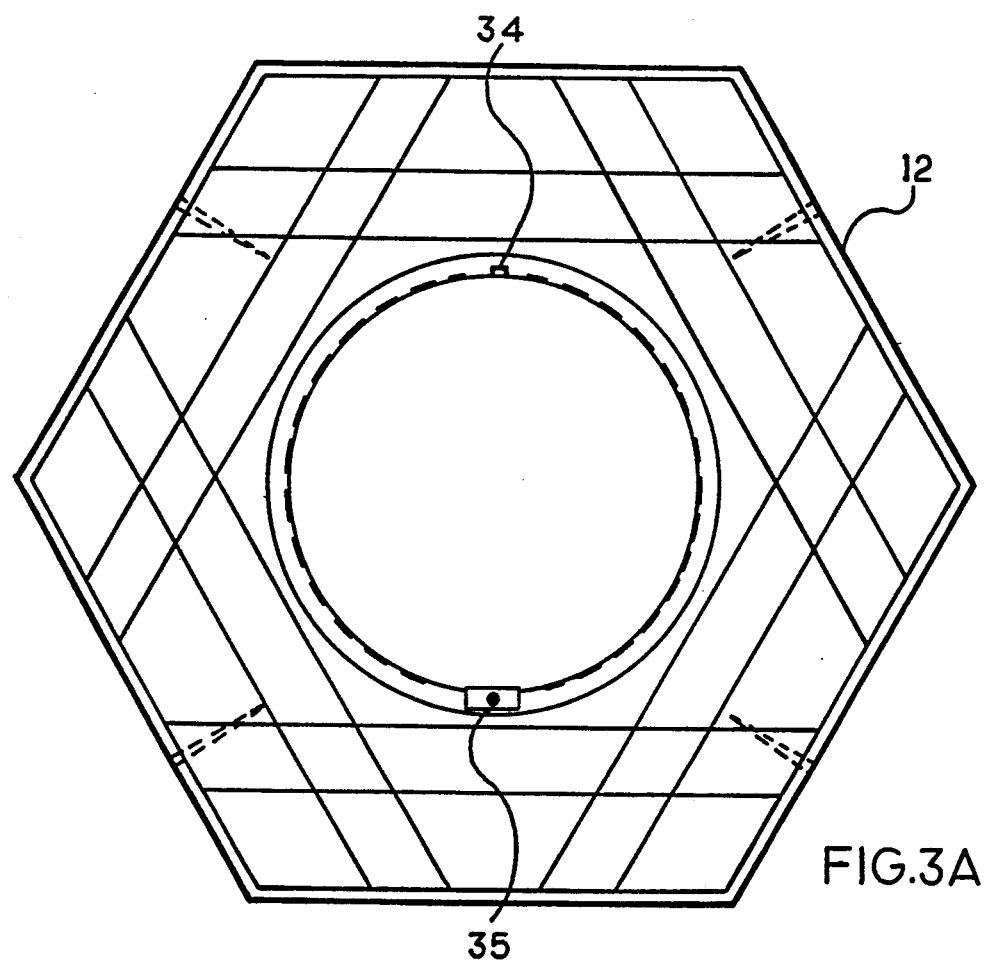
FIG. 3A is a plan view of the cover for the utility pull box of FIG. 1.
Figure 3B:
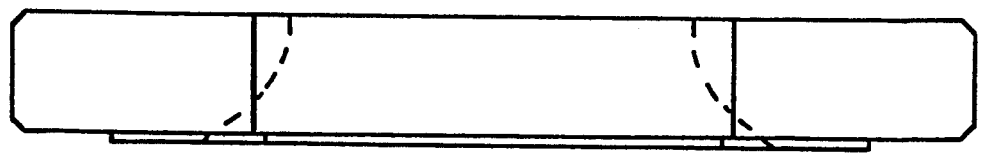
FIG. 3B is an elevation view of the cover of FIG. 3A.
Figure 3C:
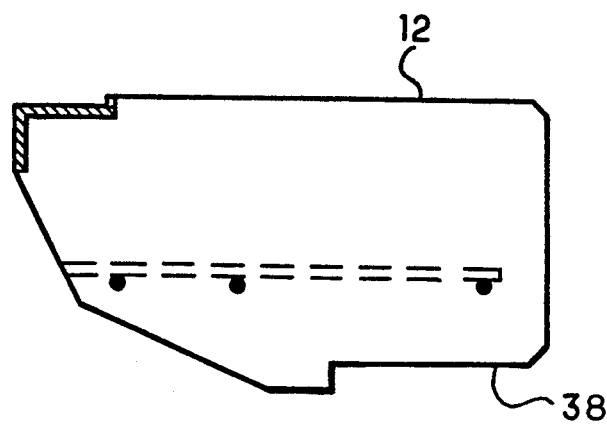
FIG. 3C is a view taken along IIIC—IIIC at FIG. 3A.

Reference is now made to FIG. 3 where the cover 12 and lid 40 are illustrated. The cover 12 has a hexagonal configuration similar to the configuration of the pull box 10 and is likewise made from reinforced concrete. Reference is made to FIG. 3C where the configuration of the cover 12 is more clearly seen. A groove 38 on the cover 12 is formed on the lower outside periphery and a steel angle 33 is mounted about the inner circumference of the cover 12. A cavity 34 (FIG. 4B) is formed in the concrete of the cover 12 and a groove 54 allows a complimentary protuberance 37 of the lid 40 to be inserted therein when the lid 40 is installed in the cover 12 as will be described in greater detail hereafter. A box 60 is cut in the concrete of the cover 12. The box 60 is used to allow secure attachment of the lid 40 to the cover 12 by way of a head bolt 43 extending through the lid 40 into a complementary threaded plate 61 on the cover 12 as will also be described hereafter. Appropriate hardware is also installed in the cover 12 to allow lifting the cover 12.

Figure 4A:
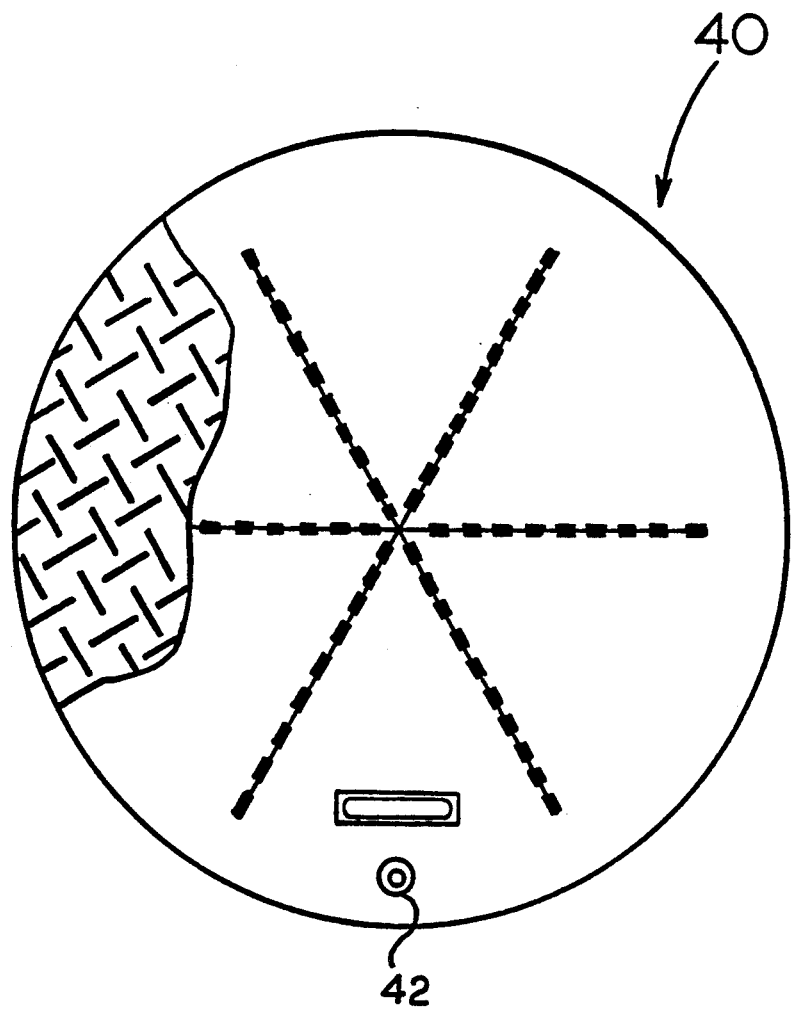
FIG. 4A is a plan view of the lid used to close the cover.
Figure 4B:
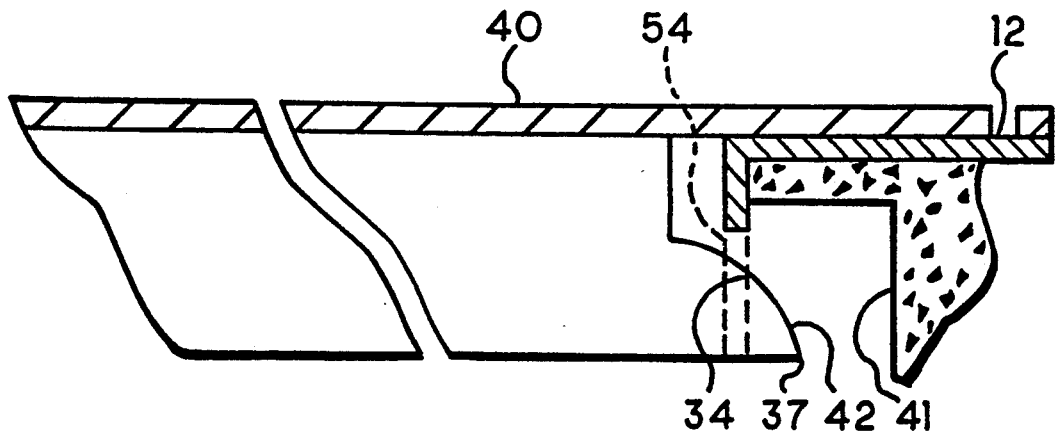
FIG. 4B is an enlarged view of the end of the lid of FIG. 4A inserted in the cover.
Figure 4C:
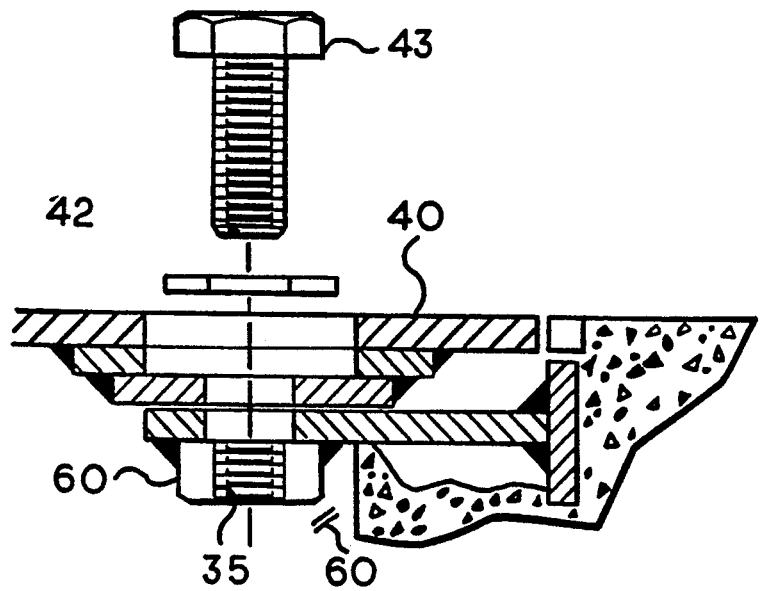
FIG. 4C is an enlarged view of the security closing mechanism between the lid and cover.

Reference is now made to FIG. 4A where the lid 40 is shown in some detail. The lid 40 is made from checker plate steel and is circular. A protuberance 34 (FIG. 4B) extends from the periphery of the lid 40 and this protuberance 34 fits into a complementary box 41 when the lid 40 is placed in position on cover 12 as better illustrated in FIG. 4B. A hole 42 extends through the lid 40 and is axial with the opening 35 in cover 12 (FIG. 4C). A bolt 43 extends through the lid 40 and into the hole 35 of cover 12 to secure the lid 40 to the cover 12 by threaded plate 61.

Figure 5A:
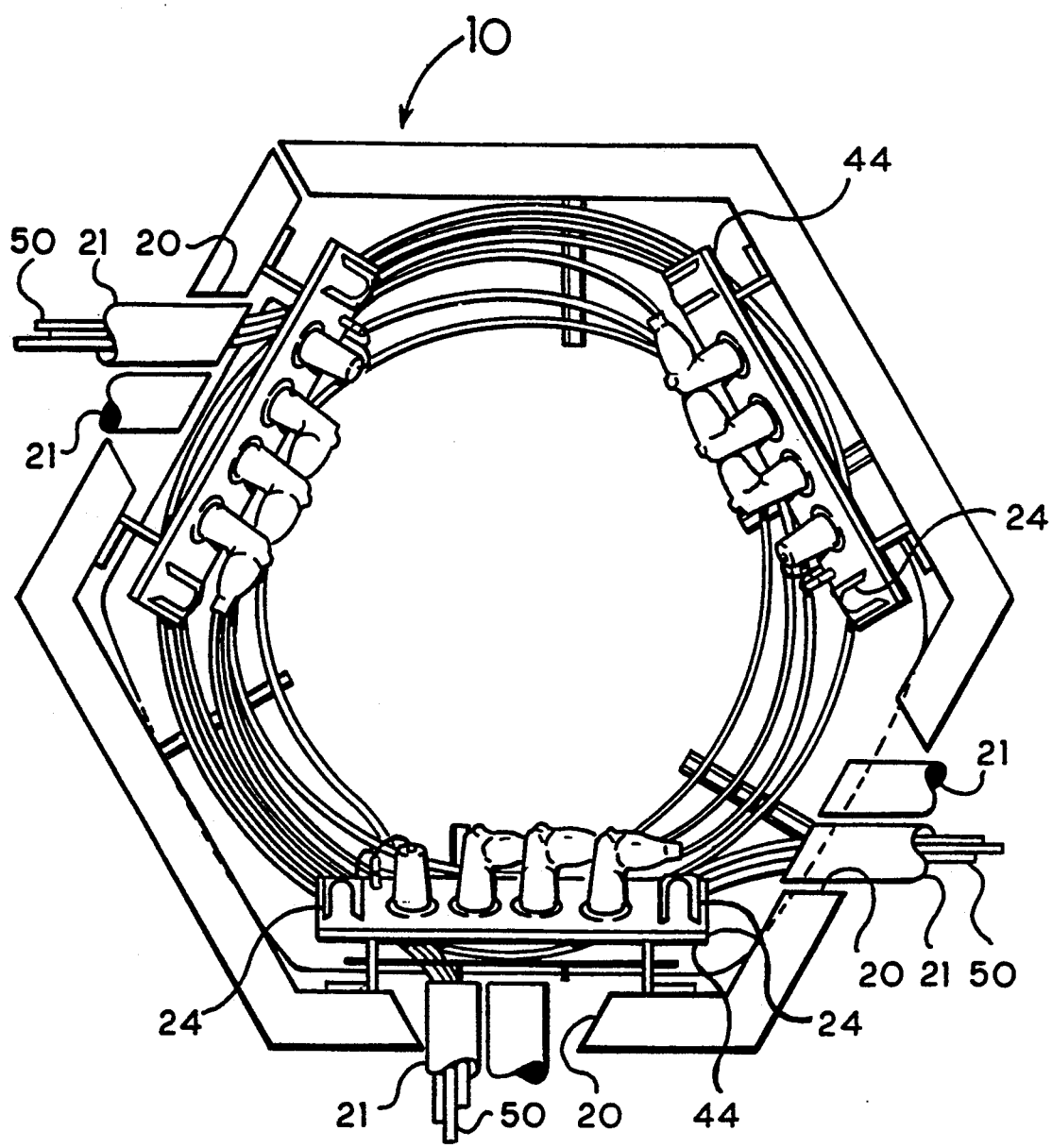
FIG. 5A is a diagrammatic plan view of the utility pull box in a distribution type internal configuration.
Figure 5B:
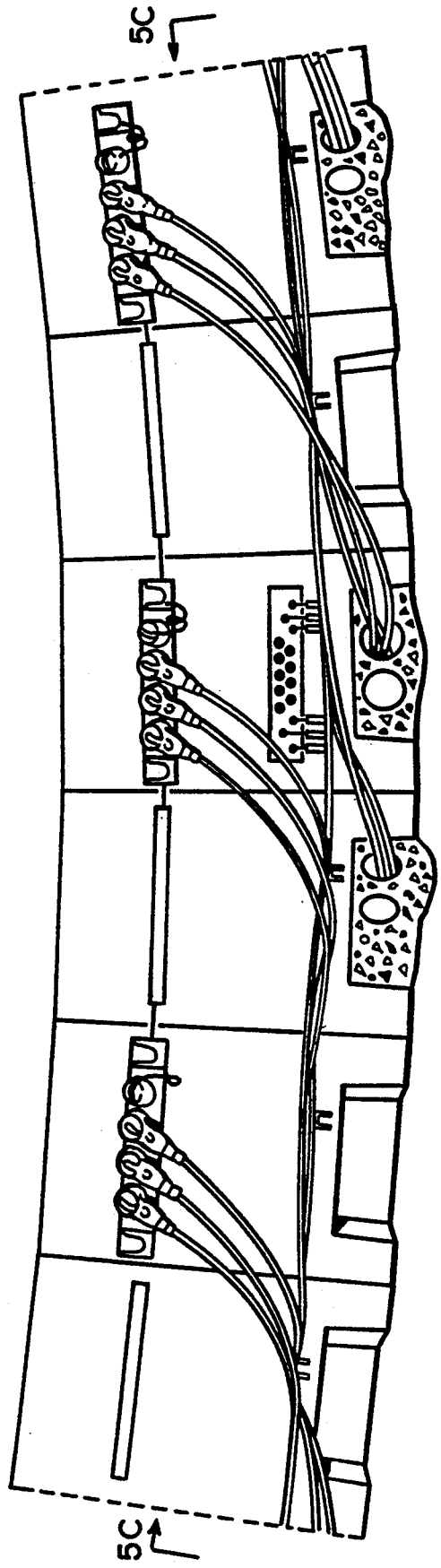
FIG. 5B is a diagrammatic elevation view of the distribution type box of FIG. 5A illustrating the cable configuration.
Figure 5C:
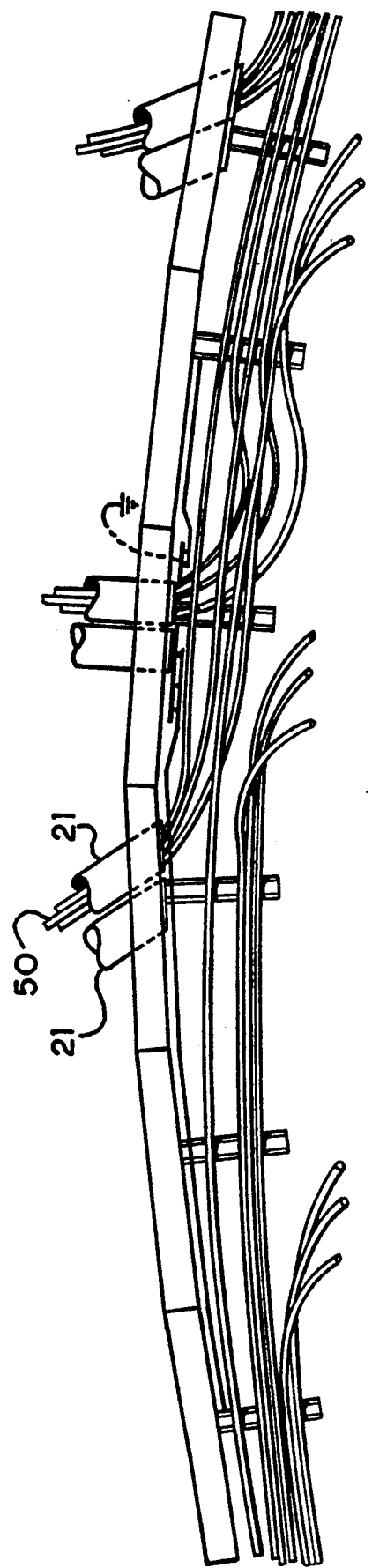
FIG. 5C is a diagrammatic sectional view taken along 5C—5C of FIG. 5B.

Reference is now made to FIG. 5A where the utility pull box 10 is shown in a distribution type configuration. In this configuration, a plurality of busses 44 are mounted to the C-channels 24. A series of 25 kv, number 1, three wire distribution cables 50, for example, enter the windows 20 through ducts 21. The cables 50 are three wire cables and each of the wires is attached to one of the respective busses 44. Each cable 50 smoothly exits the duct 21 as it enters the interior of the pull box 10 as seen also in FIG. 5C and travels smoothly around the inside circumference of the utility pull box 10 as seen in FIGS. 5A and 5C to a point where each wire of the cable 50 is then connected to the correct buss 44 as viewed in FIG. 5B.

Figure 6A:
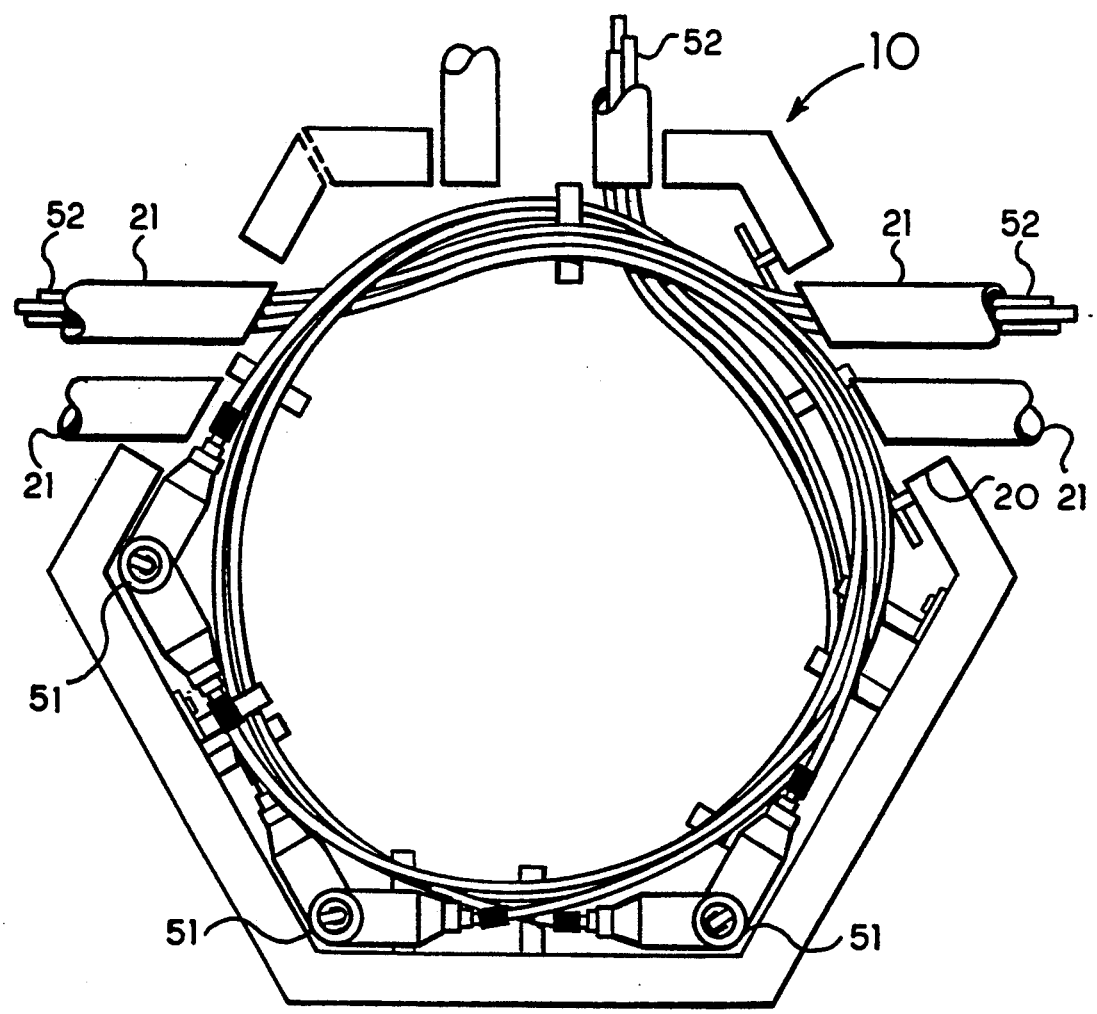
FIG. 6A is a diagrammatic plan view of the utility pull box of FIG. 1 in a feeder type internal configuration.
Figure 6B:
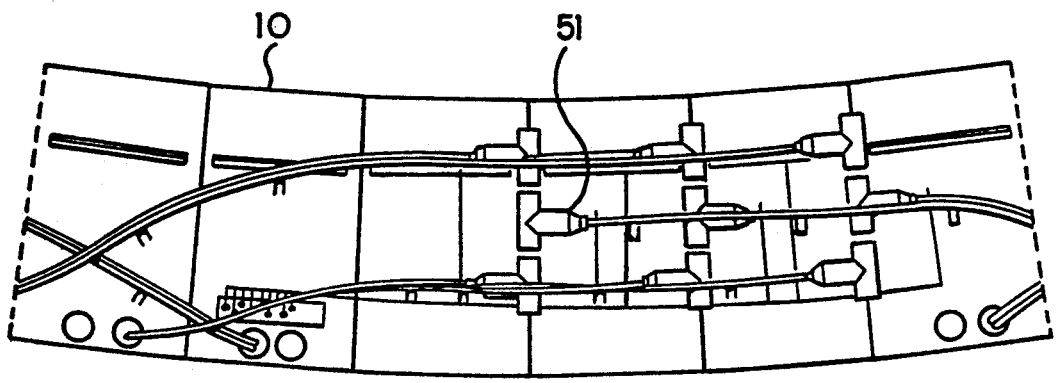
FIG. 6B is a diagrammatic elevation view of the pull box of FIG. 6A.

Reference is now made to FIG. 6 where the utility pull box 10 is illustrated in a feeder type configuration. In this configuration, a plurality of 15 or 25 kv 600 amperes elbow connectors 51 are mounted at the junction of several of the panels of the utility box 10. As in the distribution configuration of FIG. 5, the three wire cables 52 enter the interior of the utility pull box 10 through windows 20 by way of respective ducts 21. The cables 52 smoothly extend from the windows 20 around the inside of the utility pull box 10 as seen in FIG. 6A and connect to the appropriate elbow connector 51 as viewed in FIG. 6B.

OPERATION

In operation, the utility pull box 10 is installed in the configuration illustrated in FIG. 1 at or near grade level with the surface of the ground. The windows 20 which are desired to be removed may be knocked out prior to such installation so as to allow space for the appropriate ducts 21 to enter the utility pull box 10. Cables 50 (FIG. 5A) are then threaded through the ducts 21 and are pulled into the interior of the utility box 10 by way of a pulley or winch (not shown) which may be mounted on the steel plate (not shown) connected to the inserts 31 (FIG. 2D). The proper connecting elbows are then mounted to the end of each respective cable and the proper buss hardware such as the busses 44 of FIG. 5A are mounted to the interior of the utility pull box 10. The elbows of the cables 50 are then connected to the busses 44, the cover 12 is installed and the lid 40 is lowered and connected to the cover 12 in order to close the box 10.

In the event of a power outage or if it is otherwise necessary for the cables 50 to be removed from the busses 44, the lid 40 is removed and a bar commonly known as a "hot stick" (not illustrated) is easily attached to the elbow of the cable 50 which is connected to buss 44 and which is desired to be removed. The cable is then removed and placed in the "parking" position 53 of the buss 44 for example (FIG. 5A) and the particular power disruption is isolated. It will not be necessary to isolate all power provided to the particular utility box 10 carrying the one relevant troublesome cable and, accordingly, power to other unrelated areas and users will not be disrupted because of the ease of working within the utility box 10 and minimal disruption to other cables upon the removal of one cable 50 from its operating position on buss 44.

Many further embodiments are contemplated. For example, although the utility pull box 10 which is described preferably has six panels, it could have seven or eight sides or panels so long as the interior dimensions are such to allow the cable to smoothly turn upon its entry into the pull box 10 and to generally follow a path close to the inside periphery of the pull box 10. Likewise, in such a configuration, the cover would have to be large in order to allow access to the interior. This may result in disadvantages because of the large size and consequent increase in weight.

While specific embodiments of the invention have been described, such description is made by way of example only, and should not be taken as limiting the scope of the invention as construed in accordance with the accompanying claims.

What is claimed is:

1. A utility pull box consisting of a plurality of six(6) panels joined together having a lower portion, each of said six(6) panels having the same width and having an included angle between adjacent ones of said panels of one-hundred twenty (120) degrees and a plurality of windows mounted in said lower portion of at least some of said panels for allowing entry and egress of power cables between the outside and interior of said pull box.

2. A utility pull box as in claim 1 wherein said windows are knockout windows made of concrete material.

3. A utility pull box as in claim 2 wherein said utility pull box is manufactured from a reinforced concrete material.

4. The utility pull box as in claim 3 and further comprising means mounted in the interior of said box for mounting power cable connecting hardware.

5. The utility pull box as in claim 4 and further comprising a cover removably mounted to said pull box, said cover being manufactured from concrete material and having a circular hole centrally mounted therein for mounting a lid, said cover further having means to allow said lid to be removably and securely mounted to said cover.

6. A utility pull box as in claim 5 wherein said cable connecting hardware is a plurality of busses.

7. A utility pull box as in claim 5 wherein said cable connecting hardware is a plurality of elbow connectors.

8. The utility pull box as in claim 6 and further comprising a plurality of cable carrying ducts extending through at least some of said plurality of windows and said panels.

9. The utility pull box of claim 1 and further comprising a plurality of cable carrying ducts extending through at least some of said plurality of windows and said panels and wherein said ducts extend through said windows at angles between 90 degrees and 30 degrees with respect to said panels.

* * * * *